(12) United States Patent
Jeon et al.

(10) Patent No.: US 8,830,622 B1
(45) Date of Patent: Sep. 9, 2014

(54) SPINDLE MOTOR AND RECORDING DISK DRIVING DEVICE HAVING THE SAME

(71) Applicant: Samsung Electro-Mechanics Co., Ltd., Suwon (KR)

(72) Inventors: Il Geun Jeon, Suwon (KR); Tae Young Choi, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/866,560

(22) Filed: Apr. 19, 2013

(30) Foreign Application Priority Data

Feb. 18, 2013 (KR) .................. 10-2013-0016845

(51) Int. Cl.
*G11B 17/02* (2006.01)

(52) U.S. Cl.
USPC ........................................ 360/99.08

(58) Field of Classification Search
USPC ........................................ 360/99.08
See application file for complete search history.

(56) References Cited

U.S. PATENT DOCUMENTS

| | | | |
|---|---|---|---|
| 7,118,278 B2 | 10/2006 | Gomyo et al. | |
| 7,866,047 B2 | 1/2011 | Tamaoka | |
| 8,520,335 B2 * | 8/2013 | Mizukami et al. | 360/99.08 |
| 8,593,758 B2 * | 11/2013 | Yamamoto et al. | 360/99.08 |
| 8,711,514 B2 * | 4/2014 | Iwasaki et al. | 360/99.08 |
| 2005/0058374 A1 | 3/2005 | Gomyo et al. | |
| 2011/0115323 A1 | 5/2011 | Jang et al. | |
| 2013/0033782 A1 | 2/2013 | Park et al. | |

FOREIGN PATENT DOCUMENTS

| | | |
|---|---|---|
| JP | 2005-3115 | 1/2005 |
| JP | 2009-142019 | 6/2009 |
| JP | 2013-34373 | 2/2013 |
| KR | 10-2010-0038904 | 4/2010 |
| KR | 10-1026013 | 3/2011 |
| KR | 10-2011-0081575 | 7/2011 |
| KR | 10-2013-0008251 | 1/2013 |

OTHER PUBLICATIONS

Korean Office Action mailed Mar. 25, 2014 in corresponding Korean Application No. 10-2013-0016845.

* cited by examiner

*Primary Examiner* — Mark Blouin

(57) ABSTRACT

There is provided a spindle motor including a base member formed by firing processing a steel plate and provided with a cylindrical installation part, a shaft support part including a sleeve insertedly disposed in the installation part, a shaft rotatably supported by the shaft support part, a rotor hub fixed to an upper end of the shaft and provided with a driving magnet, and a stator core installation member disposed on the base member so as to be disposed outwardly of the installation part in a radial direction and having a stator core, wherein the stator core installation member includes a body part, an installation wall part extending from an upper surface of the body part and a support part, and the rotor hub is provided with an extending wall extending from a bottom surface thereof to form a labyrinth seal with the installation wall part.

22 Claims, 7 Drawing Sheets

SPINDLE MOTOR AND RECORDING DISK DRIVING DEVICE HAVING THE SAME

CROSS-REFERENCE TO RELATED APPLICATIONS

This application claims the priority of Korean Patent Application No. 10-2013-0016845 filed on Feb. 18, 2013, in the Korean Intellectual Property Office, the disclosure of which is incorporated herein by reference.

BACKGROUND OF THE INVENTION

1. Field of the Invention

The present invention relates to a spindle motor and a recording disk driving device having the same.

2. Description of the Related Art

A hard disk drive (HDD), a computer information storage device, reads data stored on a disk or writes data to a disk using a magnetic head.

In hard disk drives, a base plate has a head driver installed thereon, that is, a head stack assembly (HSA), capable of moving a magnetic head across the face of the disk. The magnetic head performs its function while moving to a desired position in a state in which it is suspended above a writing surface of the disk by the head driver at a predetermined height.

According to the related art, in manufacturing a base plate provided in the hard disk drive, a post-processing scheme of die-casting aluminum (Al) and then removing mold flash or the like, generated in the die-casting, has been used.

However, in the die-casting scheme according to the related art, since a process for casting, of injecting molten state aluminum (Al) into a mold to have a specific form is performed, high degrees of temperature and pressure are required, such that a large amount of energy is required in the process and processing time may be increased.

Further, in terms of a lifespan of a die-casting mold, there is a limitation thereof in manufacturing a large number of base plates using a single mold, and a base plate manufactured through the die-casting process may have poor dimensional precision.

Therefore, a base plate is manufactured using a pressing or forging method for solving a problem of a die-casting process, which leads to a problem in that a portion for the installation of a stator core may not be integrally formed with the base plate.

In addition, there is a problem in that an installation part for allowing for installation of the stator core may not be able to have a complex shape (that is, a 3D shape) on a base plate manufactured through press working.

RELATED ART DOCUMENT

Japanese Patent Laid-Open Publication No. 2009-142019

SUMMARY OF THE INVENTION

An aspect of the present invention provides a spindle motor allowing for a stator core to be stably installed on a base member formed by performing plastic working.

According to an aspect of the present invention, there is provided a spindle motor, including: a base member formed by performing plastic working on a steel plate and provided with a cylindrical installation part; a shaft support part including a sleeve insertedly disposed in the installation part; a shaft rotatably supported by the shaft support part; a rotor hub fixed to an upper end of the shaft and provided with a driving magnet disposed on an inner circumferential surface thereof; and a stator core installation member disposed on the base member so as to be disposed outwardly of the installation part in a radial direction and having a stator core fixedly installed thereon so that one end of the stator core faces the driving magnet, wherein the stator core installation member includes a body part, the inner surface of which is bonded to an outer circumferential surface of the installation part and the bottom surface of which is bonded to an upper surface of the base member, an installation wall part extending from an upper surface of the body part so as to facilitate bonding thereof to the inner circumferential surface of the stator core, and a support part having a support surface supporting the bottom surface of the stator core, and the rotor hub is provided with an extending wall extending from a bottom surface thereof to form a labyrinth seal with the installation wall part.

The installation part may have a thickness thinner than the steel plate.

A corner at which the installation wall part meets the support part may be provided with an adhesive accommodating groove.

The lower end of an inner circumferential surface of the body part may be provided with a chamfer.

An upper edge of an outer circumferential surface of the installation wall part may be inclined so as to allow the stator core to be easily installed.

The upper surface of the base member may be provided with a circuit board installation groove disposed outwardly of the stator core installation member in the radial direction.

A bottom surface of the base member may be provided with an indented groove disposed below the installation part, the indented groove being provided for bonding the shaft support part.

The indented groove may be a plurality of indented grooves spaced apart in a circumferential direction having a belt form.

The upper surface of the base member may be provided with an adhesive receiving groove disposed below a lower end of the installation part.

The shaft support part may include: a sleeve fixed to an inner circumferential surface of the installation part and having a protruded part disposed at an upper edge of an outer circumferential surface thereof; a cover member installed on a lower end of the sleeve so as to prevent a lubricating fluid provided in a bearing clearance from being leaked; and a stopper member installed on the extending wall of the rotor hub to prevent the shaft from overfloating, together with the protruded part.

The shaft support part may include: a sleeve housing fixed to an inner circumferential surface of the installation part, having a cup shape, and having a protruded part disposed at an upper edge of the outer circumferential surface thereof; a sleeve inserted into the sleeve housing: and a stopper member installed on the extending wall of the rotor hub to prevent the shaft from overfloating, together with the protruded part.

The stopper member may be provided with a stepped part into which the protruded part is inserted, and an outer circumferential surface of the stopper member may be bonded to an inner circumferential surface of the extending wall.

At least one of a lower end of the outer circumferential surface of the stopper member and a lower end of the inner circumferential surface of the extending wall may be provided with an inclined surface so as to facilitate assembly of the stopper member.

The stopper member may be installed on the extending wall by at least one of a press-fitting method and a bonding method.

A clearance formed between the outer circumferential surface of the sleeve and the inner circumferential surface of the stopper member may be provided with a liquid-vapor interface.

A clearance formed between the outer circumferential surface of the sleeve housing and the inner circumferential surface of the stopper member may be provided with a liquid-vapor interface.

The lower end of the outer circumferential surface of the sleeve may be provided with a bonding sub-groove to facilitate bonding thereof to the installation part.

The lower end of the outer circumferential surface of the sleeve housing may be provided with a bonding sub-groove so as to facilitate bonding thereof to the installation part.

The shaft support part may include: a sleeve fixed to an inner circumferential surface of the installation part and provided with an insertion groove formed in a lower end thereof; and a cover member installed on the sleeve to be disposed below the insertion groove so as to prevent a lubricating fluid provided in a bearing clearance from being leaked, wherein the lower end of the shaft is provided with a stopper part inserted into the insertion groove.

A clearance formed between the outer circumferential surface of the sleeve and the inner circumferential surface of the extending wall may be provided with a liquid-vapor interface.

A bottom surface of the extending wall may be inclined downwardly in an outer diameter direction.

According to an aspect of the present invention, there is provided a recording disk driving device, including: the spindle motor described above rotating a recording disk; ahead transfer part transferring a head reading information from the recording disk provided in the spindle motor to the recording disk; and a housing receiving the spindle motor and the head transfer part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
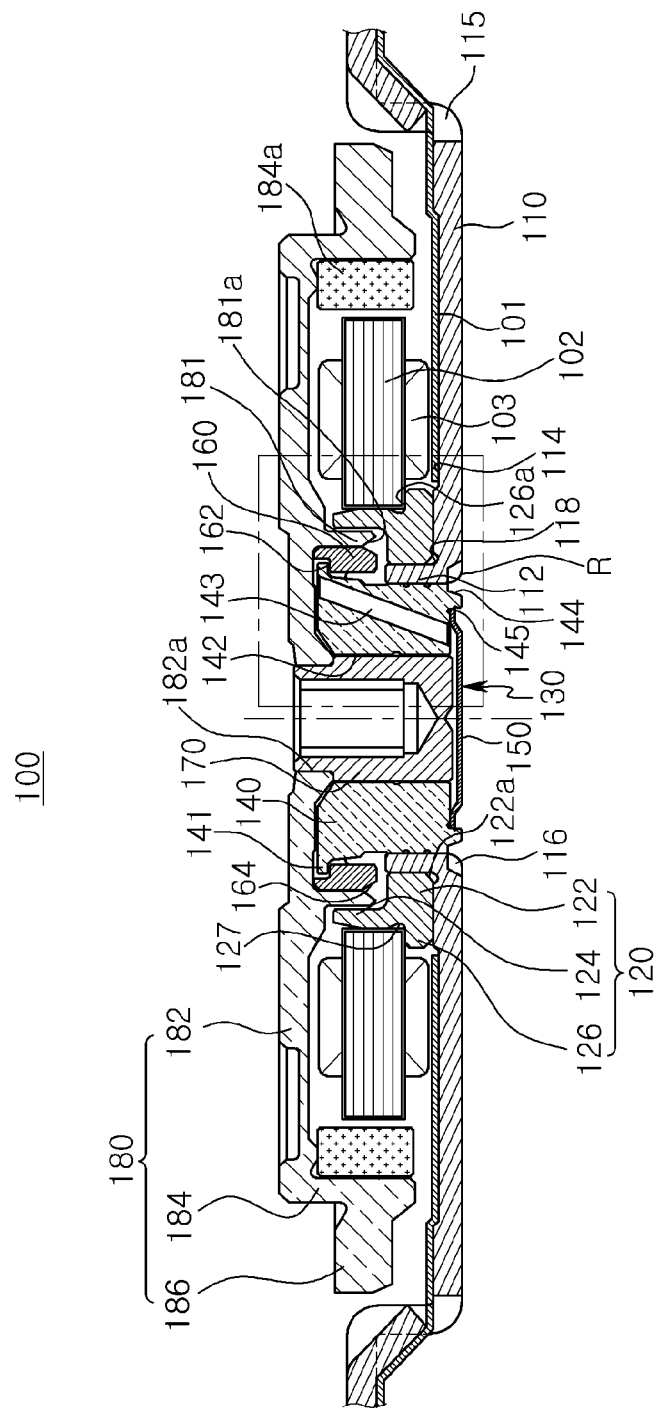
FIG. 1 is a cross-sectional view schematically illustrating a spindle motor according to an embodiment of the present invention.
Figure 2:
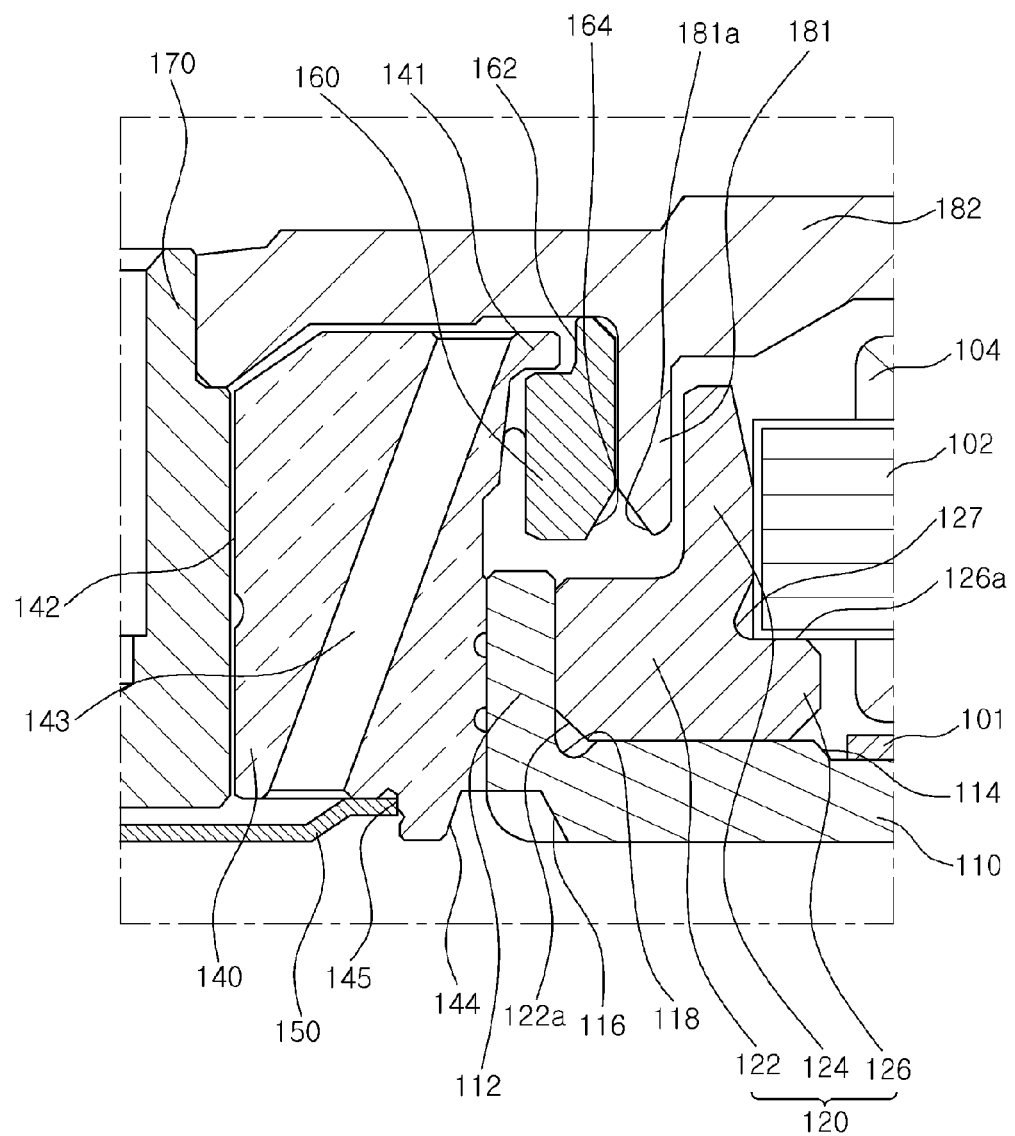
FIG. 2 is an enlarged view of part A of FIG. 1.

FIG. 1 is a cross-sectional view schematically illustrating a spindle motor according to an embodiment of the present invention and FIG. 2 is an enlarged view illustrating part A of FIG. 1.

Referring to FIGS. 1 and 2, a spindle motor 100 according to an embodiment of the present invention may include, for example, a base member 110, a stator core installation member 120, a shaft support part 130, a shaft 170, and a rotor hub 180.

Meanwhile, the spindle motor 100 according to the embodiment of the present invention may be, for example, a motor used in an information recording and reproducing device such as a hard disk drive, or the like.

Here, terms with respect to directions will be defined. When viewed in FIG. 1, an axial direction refers to a vertical direction, that is, a direction from a lower end of the shaft 170 toward an upper end thereof or a direction from the upper end of the shaft 170 toward the lower end thereof, and when viewed in FIG. 1, a radial direction refers to a horizontal direction, that is, a direction from the shaft 170 toward an outer circumferential surface of the rotor hub 170 or from the outer circumferential surface of the rotor hub 170 toward the shaft 170.

In addition, a circumferential direction refers to a direction of rotation along an outer circumferential surface of the shaft 170.

The base member 110 may be provided with an installation part 112 having a cylindrical shape. Meanwhile, the base member 110 may be formed using plastic working. For example, a steel plate may be formed as the base member 110 by press working.

The installation part 112 may be formed to be thinner than the steel plate. For example, the installation part 112 may be formed by burring working, such that the installation part 112 may have a thickness of 60 to 70% of that of the steel plate.

Meanwhile, as described above, the installation part 112 is formed to be thinner than the steel plate, such that formation precision of the installation part 112 may be improved. Further, the installation part 112 is formed to be thinner than the steel plate, such that a radius of a circular part R generated by the forming of the installation part 112 may be reduced.

Therefore, the cylindricity of the installation part 112 may be improved.

In addition, the installation part 112 is formed to be thinner than the steel plate, such that an axial length of the installation part 112 may be increased. Therefore, the bonding strength between the installation part 112 and the shaft support part 130 may be increased.

In addition, an upper surface of the base member 110 may be provided with a circuit board installation groove 114 disposed outwardly of the stator core installation member 120 in the radial direction. As an example, a circuit board 101 may be a flexible circuit board and the circuit board 101 is inserted into the circuit board installation groove 114, such that an increase in the thickness of the spindle motor 100 due to the installation of the circuit board 101 may be suppressed and contact between a coil 103 wound around the stator core 102 and the upper surface of the base member 110 may be suppressed.

Further, the base member 110 may include a withdrawal hole 115 for withdrawing the circuit board 101. One end of the circuit board 110 installed on the upper surface of the base member 110 may penetrate through the base member 110 through the withdrawal hole 115 to be withdrawn to the outside.

Further, a bottom surface of the base member 110 may be provided with an indented groove 116 disposed below the installation part 112 and the indented groove 116 is provided for bonding the shaft support part 130. When the base member 110 is bonded to the shaft support part 130 by welding, the indented groove 116 serves to accommodate soldering generated in the welding working, and when the base member 110 is bonded to the shaft support part 130 via the adhesive, the indented groove 116 serves to accommodate the adhesive.

Meanwhile, the indented hole 116 may be formed of a plurality of grooves that are spaced apart from one another in a circumferential direction having a belt form.

In addition, the upper surface of the base member 110 may be provided with an adhesive receiving groove 118 disposed at a lower end of the installation part 112. The adhesive receiving groove 118 may be formed by, for example, D-cut working. However, the embodiment of the present invention is not limited thereto, and therefore the adhesive receiving groove 118 may be formed by various working methods.

The stator core installation member 120 is installed on the base member 110 so as to be disposed outwardly of the installation part 112 in the radial direction. Further, the stator core 102 may be fixed to the stator core installation member 120 so that one end of the stator core 102 faces a driving magnet 184*a* to be described below.

Meanwhile, the stator core installation member 120 may include a body part 122 of which the inner circumferential surface is bonded to an outer circumferential surface of the installation part 112 and of which a bottom surface is bonded to the upper surface of the base member 110, an installation wall part 124 that extends from an upper surface of the body part 122 so as to facilitate bonding thereof to an inner circumferential surface of the stator core 102, and a support part 126 provided with a support surface 126*a* supporting a bottom surface of the stator core 102.

In addition, an adhesive accommodating groove 127 may be disposed in a corner at which the installation wall part 124 meets the support part 126. Further, the adhesive accommodating groove 127 may be formed by, for example, D-cut working.

Therefore, when the stator core 102 is bonded to the stator core installation member 120 via the adhesive, the bonding strength between the stator core 102 and the stator core installation member 120 may be increased by the adhesive accommodated in the adhesive accommodating groove 127.

Further, a lower end of an inner circumferential surface of the body part 122 may be provided with a chamfer 122*a* to reduce interference between the body part 122 and the installation part 112 when the stator core installation member 120 is installed on the base member 110.

That is, the lower end of the inner circumferential surface of the body part 122 may be provided with the chamfer 122*a* so that the stator core installation member 120 may be more easily assembled at the time of assembling thereof.

Further, an upper edge of an outer circumferential surface of the installation wall part 124 may be inclined so that the stator core 102 may be easily inserted. In other words, a diameter of the outer circumferential surface of the installation wall part 124 may be increased from an upper portion thereof toward a central portion thereof.

Meanwhile, the upper surface of the body part 122 and an upper surface of the installation part 112 may be sequentially disposed.

In addition, the installation wall part 124 forms a labyrinth seal with respect to an extending wall 181 of the rotor hub 180. A detailed description thereof will be provided below.

The shaft support part 130 may include a sleeve 140 insertedly disposed in the inside of the installation part 112, a cover member 150, and a stopper member 160.

The sleeve 140 may be fixed to an inner circumferential surface of the installation part 112 and an upper edge of an outer circumferential surface thereof may be provided with a protruded part 141. Meanwhile, the shaft 170 is inserted into the sleeve 140 and the sleeve 140 serves to rotatably support the shaft 170.

To this end, the sleeve 140 is provided with a shaft hole 142 into which the shaft 170 is inserted.

Meanwhile, when the shaft 170 is inserted into the sleeve 140, the outer circumferential surface of the shaft 170 and an inner circumferential surface of the sleeve 140 are spaced apart from each other by a predetermined interval to form a bearing clearance in which a lubricating fluid is provided.

Herein, describing the bearing clearance in which the lubricating fluid is provided in more detail, a clearance formed between the shaft 170 and the sleeve 140, a clearance formed between the rotor hub 180 and the sleeve 140, a clearance formed between the stopper member 160 and the sleeve 140, a clearance formed between the shaft 170 and the cover member 150, and a clearance formed between the cover member 150 and the sleeve 140 are bearing clearances provided with a lubricating fluid.

Meanwhile, the sleeve 140 may be provided with a circulation hole 143 that prevents negative pressure from occurring in the clearance formed with respect to the cover member 150. The circulation hole 143 may be inclined at a predetermined angle so that one end of the circulation hole 143 is disposed in an edge of an upper surface of the sleeve 140.

Further, a lower end of the outer circumferential surface of the sleeve 140 may be provided with a bonding sub-groove 144 to facilitate bonding thereof to the installation part 112. The bonding sub-groove 144 may form a single groove along with the indented groove 116 of the base member 110 and may be indented upwardly in an axial direction.

Therefore, when the base member 110 is bonded to the sleeve 140 by welding, a solder part formed through welding may be disposed in the bonding sub-groove 144 and the indented groove 116, and when the base member 110 is bonded to the sleeve 140 via the adhesive, the adhesive may be accommodated in the bonding sub-groove 144 and the indented groove 116.

In addition, the inner circumferential surface of the sleeve 140 may be provided with upper and lower radial dynamic grooves (not illustrated) that pump the lubricating fluid at the time of the rotation of the shaft 170 to generate a fluid dynamic pressure.

In addition, the upper surface of the sleeve 140 may be provided with a thrust dynamic groove (not illustrated) that pumps the lubricating fluid during rotation of the rotor hub 180 to generate a fluid dynamic pressure.

Meanwhile, the lower end of the sleeve 140 may be provided with a coupling groove 145 for installing the cover member 150.

The cover member 150 may be installed on the lower end of the sleeve 140 so as to prevent the lubricating fluid provided in the bearing clearance from being leaked toward the lower end of the sleeve 140.

Meanwhile, the cover member 150 may have a circular plate shape and an outer edge thereof may be bent to be installed on the sleeve 140.

The stopper member 160 may be installed on the extending wall 181 of the rotor hub 180 to prevent the shaft 170 from overfloating, together with the protruded part 141.

Described in more detail, the stopper member 160 may be provided with a stepped part 162 into which the protruded part 141 is inserted, and an outer circumferential surface of the stopper member 160 may be bonded to an inner circumferential surface of the extending wall 181.

Further, the stopper member 160 may be installed on the extending wall 181 by at least one of a press-fitting method and a bonding method.

Meanwhile, an inner circumferential surface of the stopper member 160 and the upper end of the outer circumferential surface of the sleeve 140 may be provided with a sealing part in which an interface (that is, a liquid-vapor interface) between the lubricating fluid and air is formed. In other words, the liquid-vapor interface may be disposed in the clearance formed between the inner circumferential surface of the stopper member 160 and the upper end of the outer circumferential surface of the sleeve 140.

Further, at least one of a lower end of the outer circumferential surface of the stopper member 160 and a lower end of an inner circumferential surface of the extending wall 181 may be provided with an inclined surface 164 or 181a to facilitate assembly of the stopper member 160.

The shaft 170 is rotatably supported by the shaft support part 130. That is, as described above, the shaft 170 is inserted into the shaft hole 142 of the sleeve 140, and in this case, the upper end of the shaft 170 may be protruded therefrom to allow the end thereof to be disposed above the sleeve 140.

The rotor hub 180 may be fixed to the upper end of the shaft 170 and an inner circumferential surface thereof may be provided with the driving magnet 184a.

Meanwhile, the rotor hub 180 may include a disk-shaped rotor hub body 182 provided with a through hole 182a into which the shaft 170 is inserted, a magnet installation part 184 that extends downwardly in an axial direction from an edge of the rotor hub body 182, and a disk support part 186 that extends outwardly in the radial direction from the magnet installation part 184.

Meanwhile, the extending wall 181 extends downwardly from a bottom surface of the rotor hub body 182 in an axial direction.

In addition, the extending wall 181 is disposed inwardly of the installation wall part 124 of the stator core installation member 120 in the radial direction and forms the labyrinth seal with the installation wall part 124.

Therefore, an amount of evaporation of the lubricating fluid may be reduced. That is, the evaporation of the lubricating fluid may be reduced by suppressing air containing the evaporated lubricating fluid from being leaked to the outside.

Herein, a rotation driving mechanism of the rotor hub 180 will be briefly described.

An inner surface of the magnet installation part 184 may be fixedly provided with the driving magnet 184a. Therefore, an inner surface of the driving magnet 184a may face a leading edge of the stator core 102.

Meanwhile, the driving magnet 184a may be a permanent magnet in which the N pole and the S pole are alternately magnetized in a circumferential direction to generate a predetermined amount of magnetic force.

When power is supplied to the coil 103 wound around the stator core 102, a driving force rotating the rotor hub 180 by electromagnetic interaction between the stator core 102 around which the coil 103 is wound and the driving magnet 184a is generated, and thus the rotor hub 180 rotates.

That is, the rotor hub 180 rotates by the electromagnetic interaction between the driving magnet 184a and the stator core 102 around which the coil 103 is wound and which faces the driving magnet 184a.

In addition, the shaft 170 having the rotor hub 180 fixed thereto rotates together with the rotor hub 180, through the rotation of the rotor hub 180.

As described above, the stator core 102 may be more easily and stably installed on the base member 110 formed by performing the plastic working, through the stator core installation member 120.

In addition, the installation part 112 is formed to be thinner than the steel plate by the burring working, thereby increasing an axial length of the installation part 112.

Therefore, the bonding strength between the installation part 112 and the sleeve 140 may be increased and the cylindricity of the installation part 112 may be improved.

Meanwhile, the adhesive accommodating groove 127 is disposed in the corner at which the installation wall part 124 of the stator core installation member 120 meets the support part 126, and therefore the separation of the stator core 102 from the stator core installation member 120 may be suppressed.

Further, even when the stator core 102 has burrs formed thereon through the adhesive accommodating groove 127, the stator core 102 may be installed on the stator core installation member 120 without being inclined. In other words, even when a lower end of the inner circumferential surface of the stator core 102 has burrs formed thereon, the burrs may be inserted into the adhesive accommodating groove 127, thereby preventing the stator core 102 installed on the stator core installation member 120 from being inclined.

In addition, interference with the installation part 112 may be reduced by the chamfer 122a disposed at the lower end of the inner circumferential surface of the body part 122 of the stator core installation member 120 at the time of assembling the stator core installation member 120.

Further, the upper end of the outer circumferential surface of the installation wall part 124 of the stator core installation member 120 is inclined, such that the stator core 102 may be more easily installed on the stator core installation member 120.

Meanwhile, the upper surface of the base member 110 is provided with the circuit board installation groove 114 disposed outwardly of the stator core installation member 120 in the radial direction, thereby preventing the thickness of the spindle motor 100 from increasing and suppressing contact between the upper surface of the base member 110 and the coil 103.

Further, when the base member 110 is bonded to the sleeve 140 through the bonding sub-groove 144 of the sleeve 140 and the indented groove 116 of the base member 110 by welding, a solder part formed through welding may be disposed in the bonding sub-groove 144 and the indented groove 116, and when the base member 110 is bonded to the sleeve 140 via the adhesive, the adhesive may be accommodated in the bonding sub-groove 144 and the indented groove 116.

Therefore, bonding strength between the sleeve 140 and the base member 110 may be increased and the increase in the thickness of the spindle motor 100 due to the adhesive or the solder part may be suppressed.

Further, the bonding strength between the stator core installation member 120 and the base member 110 may be more increased by the adhesive receiving groove 118 disposed in the upper surface of the base member 110.

Further, the stopper member 160 and the extending wall 181 may be easily assembled by the inclined surfaces 164 and 181a that are disposed at the lower end of the outer circumferential surface of the stopper member 160 and the lower end of the inner circumferential surface of the extending wall 181.

Hereinafter, a spindle motor according to another embodiment of the present invention will be described with reference to the drawings. However, the same components as the foregoing components are illustrated in the drawings using the same reference numerals and the detailed description thereof will be omitted.

Figure 3:
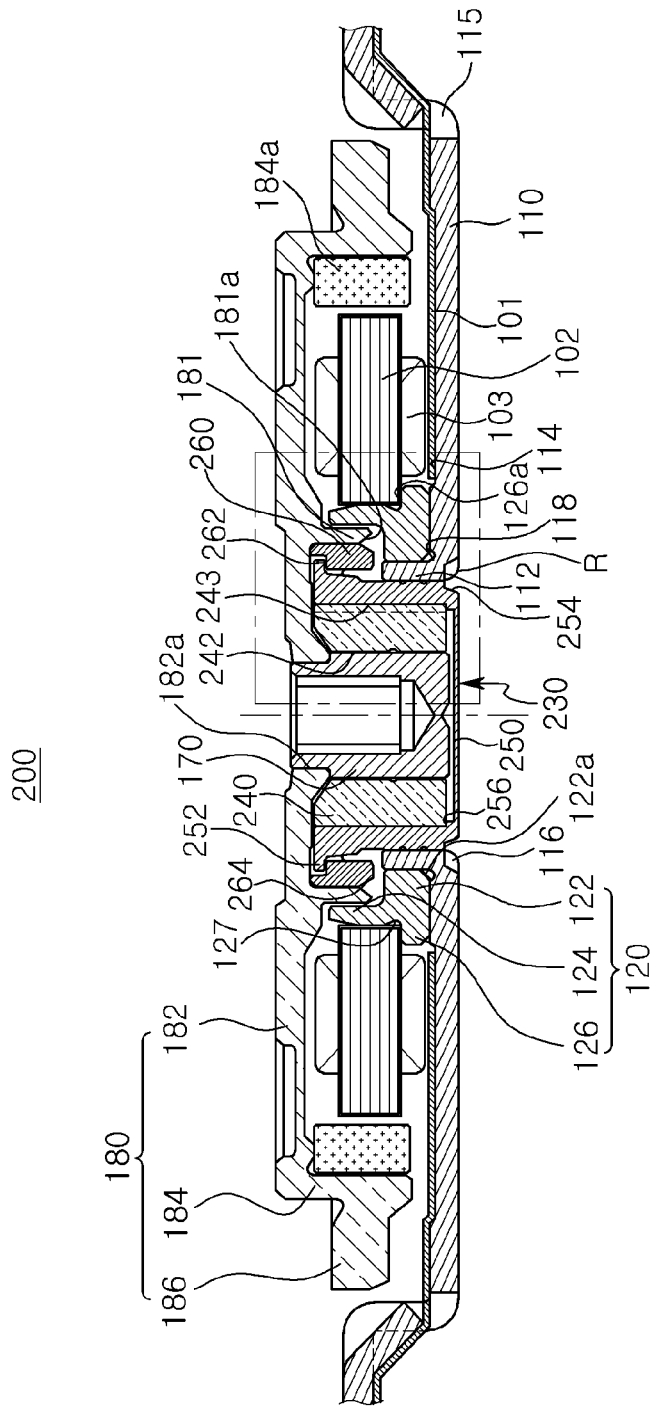
FIG. 3 is a cross-sectional view schematically illustrating a spindle motor according to another embodiment of the present invention.
Figure 4:
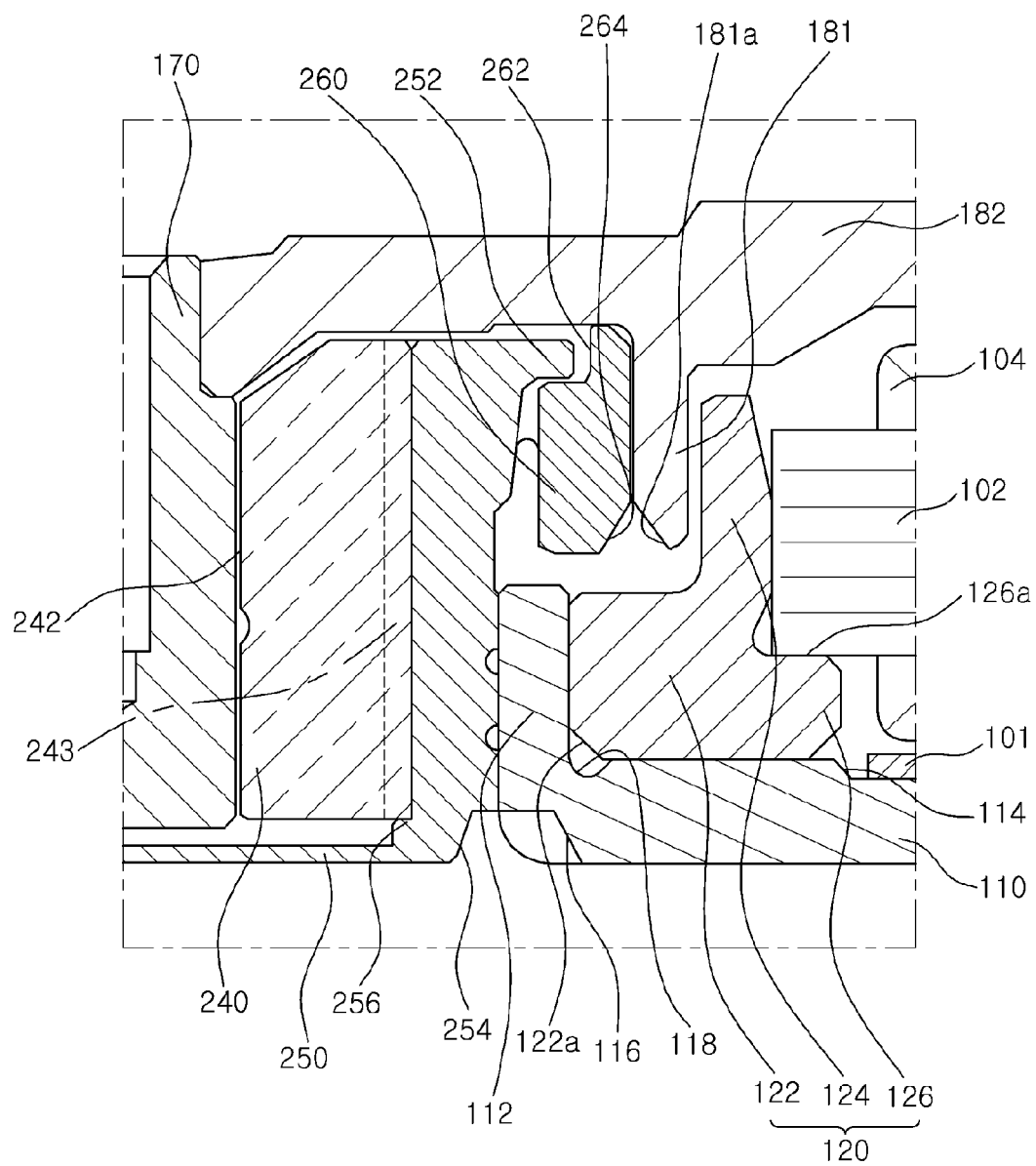
FIG. 4 is an enlarged view of part B of FIG. 3.

FIG. 3 is a cross-sectional view schematically illustrating a spindle motor according to another embodiment of the present invention and FIG. 4 is an enlarged view of part B of FIG. 3.

Referring to FIGS. 3 and 4, a spindle motor 200 according to another embodiment of the present invention may include, for example, the base member 110, the stator core installation member 120, a shaft support part 230, the shaft 170, and the rotor hub 180.

Meanwhile, the base member 110, the stator core installation member 120, the shaft 170, and the rotor hub 180 have the same configuration as the configuration of the spindle motor 100 according to the embodiment of the present invention, and therefore a detailed description thereof will be omitted herein and the description thereof will be replaced with the foregoing description.

The shaft support part 230 may include a sleeve 240 insertedly disposed in the installation part 112, a sleeve housing 250, and a stopper member 260.

The sleeve 240 may be inserted into the sleeve housing 250 and may have a hollow cylindrical shape. That is, the sleeve 240 may be provided with a shaft hole 242 into which the shaft 170 is inserted, and an outer circumferential surface of the sleeve 240 may be bonded to an inner circumferential surface of the sleeve housing 250.

Meanwhile, the outer circumferential surface of the sleeve 240 may be provided with a circulation groove 243 providing a path for movement of a lubricating fluid.

In addition, the sleeve 240 may be formed by sintering. Therefore, upper and lower radial dynamic grooves (not illustrated) and a thrust dynamic groove (not illustrated) that are disposed on at least one of an inner circumferential surface and an upper surface of the sleeve 240 may be more integrally formed at the time of forming the sleeve 240.

The sleeve housing 250 may be fixed to the inner circumferential surface of the installation part 112 and may have a cup shape. In addition, an upper edge of an outer circumferential surface of the sleeve housing 250 may be provided with a protruded part 252.

Further, a clearance formed between the outer circumferential surface of the sleeve housing 250 and an inner circumferential surface of the stopper member 260 may be provided with a liquid-vapor interface. To this end, at least one of the outer circumferential surface of the sleeve housing 250 and the inner circumferential surface of the stopper member 260 may be inclined. In other words, at least one of the outer circumferential surface of the sleeve housing 250 and the inner circumferential surface of the stopper member 260 may be inclined so that the liquid-vapor interface may be formed by a capillary phenomenon.

Meanwhile, a lower end of the outer circumferential surface of the sleeve housing 250 may be provided with a bonding sub-groove 254 to facilitate bonding thereof to the installation part 112.

The bonding sub-groove 254 may form a single groove along with the indented groove 116 of the base member 110 and may be indented upwardly in an axial direction.

Therefore, when the base member 110 is bonded to the sleeve housing 250 by welding, a solder part formed through the welding may be disposed in the bonding sub-groove 254 and the indented groove 116, and when the base member 110 is bonded to the sleeve housing 250 via the adhesive, the adhesive may be accommodated in the bonding sub-groove 254 and the indented groove 116.

Meanwhile, the sleeve housing 250 may be formed by various working methods, such as cutting, pressing, injection working, and the like.

In addition, an inner surface of the sleeve housing 250 may be provided with a protruded sill 256 for guiding an installation position of the sleeve 240. That is, the sleeve 240 may be installed in the sleeve housing 250 so that a bottom surface of the sleeve 240 is supported by the protruded sill 256.

Therefore, the bottom surface of the sleeve 240 and a bottom surface of the inside of the sleeve housing 250 may be spaced apart from each other.

The stopper member 260 may be installed on the extending wall 181 of the rotor hub 180 to prevent the shaft 170 from overfloating, together with the protruded part 252.

Described in more detail, the stopper member 260 may be provided with a stepped part 262 into which the protruded part 252 is inserted, and an outer circumferential surface of the stopper member 260 may be bonded to an inner circumferential surface of the extending wall 181.

Further, the stopper member 260 may be installed on the extending wall 181 by at least one of a press-fitting method and a bonding method.

Meanwhile, the inner circumferential surface of the stopper member 260 and the upper end of the outer circumferential surface of the sleeve housing 250 may form a sealing part in which an interface (that is, a liquid-vapor interface) between the lubricating fluid and air is formed. In other words, the liquid-vapor interface may be disposed in a clearance formed between the inner circumferential surface of the stopper member 260 and the upper end of the outer circumferential surface of the sleeve housing 250.

Further, at least one of a lower end of the outer circumferential surface of the stopper member 260 and a lower end of the inner circumferential surface of the extending wall 181 may be provided with an inclined surface 264 or 181a to facilitate assembly of the stopper member 260.

Hereinafter, a spindle motor according to another embodiment of the present invention will be described with reference to the drawings. However, the same components as the foregoing components are illustrated in the drawings using the same reference numerals and detailed descriptions thereof will be omitted.

Figure 5:
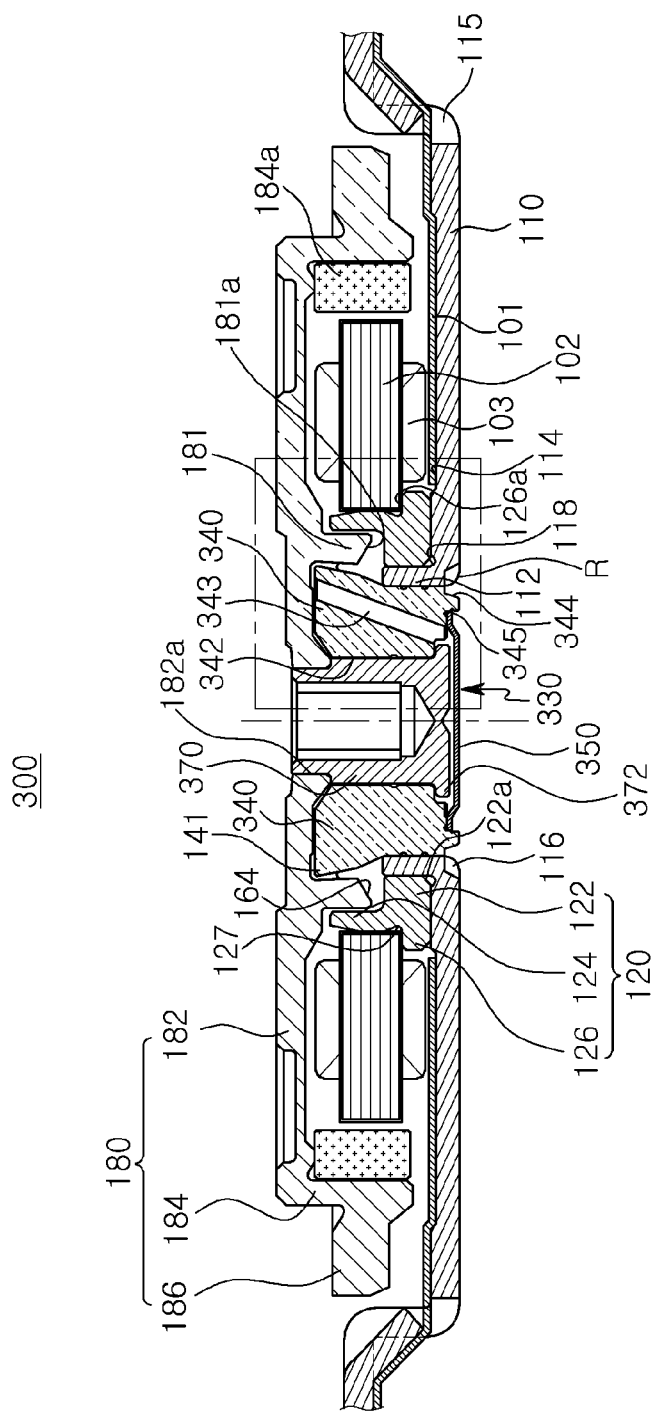
FIG. 5 is a cross-sectional view schematically illustrating a spindle motor according to another embodiment of the present invention.
Figure 6:
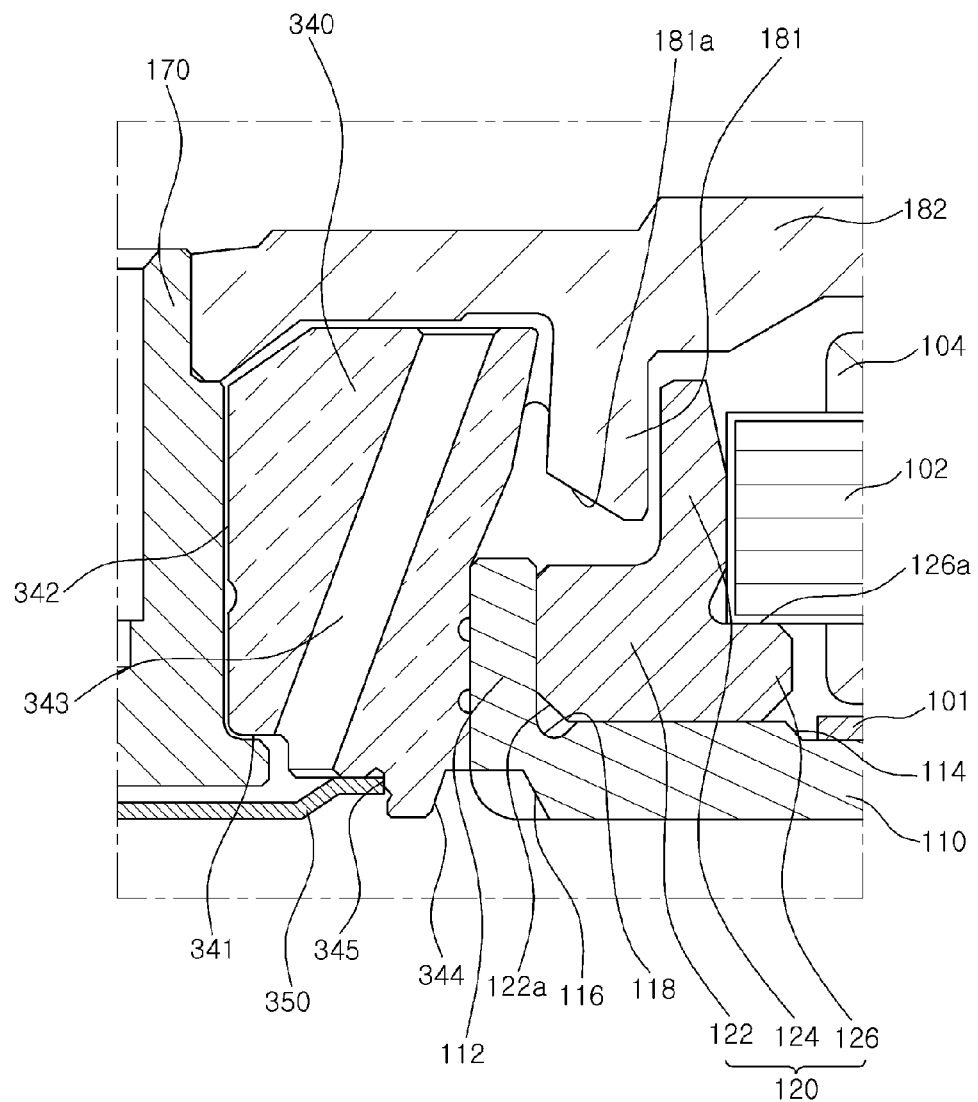
FIG. 6 is an enlarged view illustrating part C of FIG. 5.

FIG. 5 is a cross-sectional view schematically illustrating a spindle motor according to another embodiment of the present invention and FIG. 6 is an enlarged view illustrating part C of FIG. 5.

Referring to FIGS. 5 and 6, a spindle motor 300 according to another embodiment of the present invention may include, for example, the base member 110, the stator core installation member 120, a shaft support part 330, a shaft 370, and the rotor hub 180.

Meanwhile, the base member 110, the stator core installation member 120, and the rotor hub 180 have the same configuration as the configuration of the spindle motor 100 according to the embodiment of the present invention, and therefore a detailed description thereof will be omitted herein and the description thereof will be replaced with the foregoing description.

The shaft support part 330 may be insertedly disposed in the installation part 112. Meanwhile, the shaft support part 330 may include a sleeve 340 and a cover member 350.

The sleeve 340 may be fixed to the inner circumferential surface of the installation part 112 and a lower end thereof may be provided with an insertion groove 341. Meanwhile, the shaft 370 is inserted into the sleeve 340 and the sleeve 340 serves to rotatably support the shaft 370.

To this end, the sleeve 340 may be provided with a shaft hole 342.

Further, an inner circumferential surface of the sleeve 340 may be provided with upper and lower radial dynamic grooves (not illustrated) and an upper surface of the sleeve 340 may be provided with a thrust dynamic groove (not illustrated).

Meanwhile, the sleeve 340 may be provided with a circulation hole 343 that prevents negative pressure from occurring in the clearance formed with the cover member 350. The circulation hole 343 may be inclined at a predetermined angle so that one end of the circulation hole 343 is disposed in an edge of the upper surface of the sleeve 340.

Further, the lower end of the outer circumferential surface of the sleeve 340 may be provided with a bonding sub-groove 344 to facilitate bonding thereof to the installation part 112. The bonding sub-groove 344 may form a single groove along with the indented groove 116 of the base member 110 and may be indented upwardly in an axial direction.

Therefore, when the base member 110 is bonded to the sleeve 340 by welding, the solder part may be disposed in the bonding sub-groove 344 and the indented groove 116, and when the base member 110 is bonded to the sleeve 340 via the adhesive, the adhesive may be accommodated in the bonding sub-groove 344 and the indented groove 116.

Further, the lower end of the sleeve 340, in other words, a lower portion of the insertion groove 341 may be provided with a coupling groove 345 for installing the cover member 350.

An edge of the cover member 350 may be bonded to the coupling groove 345 of the sleeve 340 so as to prevent the lubricating fluid provided in the bearing clearance from being leaked to the lower end of the sleeve 340.

Further, the cover member 350 may have a circular plate shape and the edge thereof may be bent so as to be installed on the sleeve 340.

Meanwhile, in the present embodiment, the stopper member is not installed on the shaft support part 330 and instead, a lower end of the shaft 370 may be provided with a stopper part 372 inserted into the insertion groove 341 of the sleeve 340.

That is, the overfloating of the shaft 370 due to the external impacts or abnormal operation thereof may be prevented by the stopper part 372.

Meanwhile, the stopper part 372 may also be integrally formed with the shaft 370 and may be separately manufactured so as to be coupled with the shaft 370.

Meanwhile, in the present embodiment, the liquid-vapor interface is disposed in a clearance formed between an outer circumferential surface of the sleeve 340 and the inner circumferential surface of the extending wall 181 and to this end, the outer circumferential surface of the sleeve 340 may be inclined.

In addition, the bottom surface of the extending wall 181 may be provided with the inclined surface 181a so as to more facilitate the coupling of the sleeve 340.

Hereinafter, a spindle motor according to an embodiment of the present invention will be described with reference to the drawings.

Figure 7:
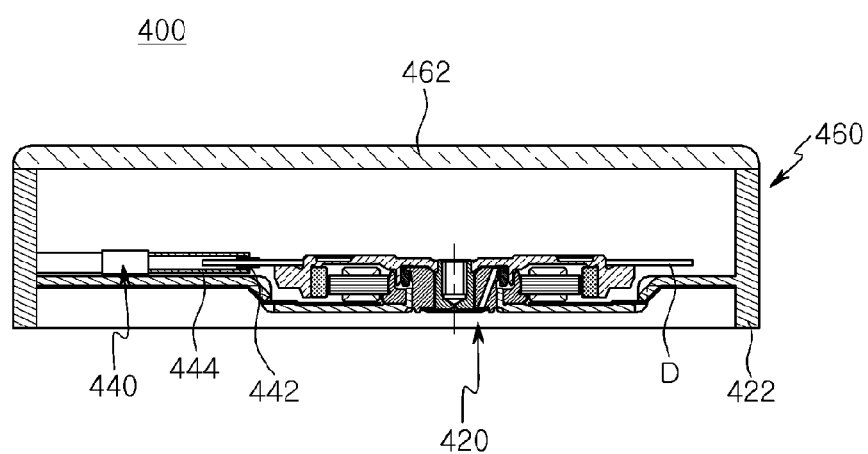
FIG. 7 is a cross-sectional view schematically illustrating a recording disk driving device according to an embodiment of the present invention.

FIG. 7 is a cross-sectional view schematically illustrating a recording disk driving device according to an embodiment of the present invention.

Referring to FIG. 7, a recording disk driving device 400 according to the embodiment of the present invention is a hard disk driving device and may include a spindle motor 420, a head transfer part 440, and a housing 460.

However, FIG. 7 illustrates, by way of example, the case in which the spindle motor 100 according to the embodiment of the present invention is adopted, but the embodiment of the present invention is not limited thereto. The spindle motor 420 may be any one of the spindle motor 100 according to the embodiment of the present invention, the spindle motor 200 according to another embodiment of the present invention, and the spindle motor 300 according to another embodiment of the present invention, as described above.

Therefore, the detailed description and reference numerals of the spindle motor 420 will be replaced with the foregoing description and will be omitted below.

Further, the spindle motor 420 may include a recording disk D mounted thereon.

The head transfer part 440 transfers a head 442 detecting information of the recording disk D mounted on the spindle motor 420 to a surface of the recording disk D to be detected. The head 442 is disposed on a support part 444 of the head transfer part 440.

The housing 460 may include a base member 422 and a top cover 462 that shields an upper portion of the base member 422 so as to form an inner space receiving the motor 420 and the head transfer part 440.

As set forth above, according to the embodiment of the present invention, the stator core may be more easily installed using the stator core installation member.

Further, the installation part may be formed by the burring working so as to be thinner than the steel plate, thereby increasing the axial length of the installation part.

Therefore, the bonding strength between the installation part and the sleeve may be increased and the cylindricity of the installation part may be improved.

Meanwhile, the adhesive accommodating groove may be disposed in a corner at which the installation wall part of the stator core installation member meets the support part, thereby suppressing the stator core from separating from the stator core installation member.

In addition, even when the stator core has the burr formed thereon through the adhesive accommodating groove, the stator core may be installed on the stator core installation member without being inclined. In other words, even when the lower end of the inner circumferential surface of the stator core has the burr generated thereon, the burr may be inserted into the adhesive accommodating groove, thereby preventing the stator core from being inclined when being installed on the stator core installation member.

In addition, the interference between the body part and the installation part may be reduced at the time of assembling the stator core installation member by the chamfer disposed at the lower end of the inner circumferential surface of the body part of the stator core installation member.

Further, the upper end of the outer circumferential surface of the installation wall part of the stator core installation member may be inclined, thereby more easily installing the stator core on the stator core installation member.

Meanwhile, the upper surface of the base member may be provided with the circuit board installation groove disposed outwardly of the stator core installation member in the radial direction, thereby preventing the thickness of the spindle motor from increasing and suppressing the contact between the upper surface of the base member and the coil.

In addition, when the base member is bonded to the sleeve through the bonding sub-groove of the sleeve and the indented groove of the base member by welding, the solder part may be disposed in the bonding sub-groove and the indented groove, and when the base member is bonded to the sleeve via the adhesive, the adhesive may be accommodated in the bonding sub-groove and the indented groove.

Therefore, the bonding strength between the sleeve and the base member may be increased and an increase in the thickness of the spindle motor due to the adhesive or the solder part may be suppressed.

Further, the bonding strength between the stator core installation member and the base member may be more increased by the adhesive receiving groove disposed in the upper surface of the base member.

In addition, the assembly of the stopper member and the extending wall may be easily performed by the inclined surfaces that are formed on the lower end of the outer circumferential surface of the stopper member and the lower end of the inner circumferential surface of the extending wall.

While the present invention has been shown and described in connection with the embodiments, it will be apparent to those skilled in the art that modifications and variations can be made without departing from the spirit and scope of the invention as defined by the appended claims.

What is claimed is:

1. A spindle motor, comprising:
   a base member formed by performing plastic working on a steel plate and provided with a cylindrical installation part;
   a shaft support part including a sleeve insertedly disposed in the installation part;
   a shaft rotatably supported by the shaft support part;
   a rotor hub fixed to an upper end of the shaft and provided with a driving magnet disposed on an inner circumferential surface thereof; and
   a stator core installation member disposed on the base member so as to be disposed outwardly of the installation part in a radial direction and having a stator core fixedly installed thereon so that one end of the stator core faces the driving magnet,
   wherein the stator core installation member includes a body part, the inner surface of which is bonded to an outer circumferential surface of the installation part and the bottom surface of which is bonded to an upper surface of the base member, an installation wall part extending from an upper surface of the body part so as to facilitate bonding thereof to the inner circumferential surface of the stator core, and a support part having a support surface supporting the bottom surface of the stator core, and
   the rotor hub is provided with an extending wall extending from a bottom surface thereof to form a labyrinth seal with the installation wall part.

2. The spindle motor of claim 1, wherein the installation part has a thickness thinner than the steel plate.

3. The spindle motor of claim 1, wherein a corner at which the installation wall part meets the support part is provided with an adhesive accommodating groove.

4. The spindle motor of claim 1, wherein the lower end of an inner circumferential surface of the body part is provided with a chamfer.

5. The spindle motor of claim 1, wherein an upper edge of an outer circumferential surface of the installation wall part is inclined so as to allow the stator core to be easily installed.

6. The spindle motor of claim 1, wherein the upper surface of the base member is provided with a circuit board installation groove disposed outwardly of the stator core installation member in the radial direction.

7. The spindle motor of claim 1, wherein a bottom surface of the base member is provided with an indented groove disposed below the installation part, the indented groove being provided for bonding the shaft support part.

8. The spindle motor of claim 7, wherein the indented groove is a plurality of indented grooves spaced apart in a circumferential direction having a belt form.

9. The spindle motor of claim 1, wherein the upper surface of the base member is provided with an adhesive receiving groove disposed below a lower end of the installation part.

10. The spindle motor of claim 1, wherein the shaft support part includes:
    a sleeve fixed to an inner circumferential surface of the installation part and having a protruded part disposed at an upper edge of an outer circumferential surface thereof;
    a cover member installed on a lower end of the sleeve so as to prevent a lubricating fluid provided in a bearing clearance from being leaked; and
    a stopper member installed on the extending wall of the rotor hub to prevent the shaft from overfloating, together with the protruded part.

11. The spindle motor of claim 1, wherein the shaft support part includes:
    a sleeve housing fixed to an inner circumferential surface of the installation part, having a cup shape, and having a protruded part disposed at an upper edge of the outer circumferential surface thereof;
    a sleeve inserted into the sleeve housing: and
    a stopper member installed on the extending wall of the rotor hub to prevent the shaft from overfloating, together with the protruded part.

12. The spindle motor of claim 10, wherein the stopper member is provided with a stepped part into which the protruded part is inserted, and
    an outer circumferential surface of the stopper member is bonded to an inner circumferential surface of the extending wall.

13. The spindle motor of claim 12, wherein at least one of a lower end of the outer circumferential surface of the stopper member and a lower end of the inner circumferential surface of the extending wall is provided with an inclined surface so as to facilitate assembly of the stopper member.

14. The spindle motor of claim 10, wherein the stopper member is installed on the extending wall by at least one of a press-fitting method and a bonding method.

15. The spindle motor of claim 10, wherein a clearance formed between the outer circumferential surface of the sleeve and the inner circumferential surface of the stopper member is provided with a liquid-vapor interface.

16. The spindle motor of claim 11, wherein a clearance formed between the outer circumferential surface of the sleeve housing and the inner circumferential surface of the stopper member is provided with a liquid-vapor interface.

17. The spindle motor of claim 10, wherein the lower end of the outer circumferential surface of the sleeve is provided with a bonding sub-groove to facilitate bonding thereof to the installation part.

18. The spindle motor of claim 11, wherein the lower end of the outer circumferential surface of the sleeve housing is provided with a bonding sub-groove so as to facilitate bonding thereof to the installation part.

19. The spindle motor of claim 1, wherein the shaft support part includes:
- a sleeve fixed to an inner circumferential surface of the installation part and provided with an insertion groove formed in a lower end thereof; and
- a cover member installed on the sleeve to be disposed below the insertion groove so as to prevent a lubricating fluid provided in a bearing clearance from being leaked,
- wherein the lower end of the shaft is provided with a stopper part inserted into the insertion groove.

20. The spindle motor of claim 19, wherein a clearance formed between the outer circumferential surface of the sleeve and the inner circumferential surface of the extending wall is provided with a liquid-vapor interface.

21. The spindle motor of claim 20, wherein a bottom surface of the extending wall is inclined downwardly in an outer diameter direction.

22. A recording disk driving device, comprising:
a spindle motor of claim 1 rotating a recording disk;
a head transfer part transferring a head reading information from the recording disk provided in the spindle motor to the recording disk; and
a housing receiving the spindle motor and the head transfer part.

* * * * *

UNITED STATES PATENT AND TRADEMARK OFFICE
CERTIFICATE OF CORRECTION

PATENT NO. : 8,830,622 B1  
APPLICATION NO. : 13/866560  
DATED : September 9, 2014  
INVENTOR(S) : Il Geun Jeon et al.

Page 1 of 1

It is certified that error appears in the above-identified patent and that said Letters Patent is hereby corrected as shown below:

On the Title Page, Column 1, after Item [22] (Filing Date), insert Item -- [65] (Prior Publication Data) US 2014/0233133 A1 August 21, 2014 --.

In the Claims

Column 14, Line 33, In Claim 11, delete "housing:" and insert -- housing; --, therefor.

Signed and Sealed this  
Seventh Day of April, 2015

Michelle K. Lee  
*Director of the United States Patent and Trademark Office*